(12) United States Patent
Anderson

(10) Patent No.: US 6,644,800 B2
(45) Date of Patent: Nov. 11, 2003

(54) INKJET IMAGES HAVING IMPROVED VISUAL PROPERTIES AND METHODS OF MAKING SAME

(75) Inventor: Richard Anderson, Escondido, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/066,194

(22) Filed: Jan. 30, 2002

(65) Prior Publication Data

US 2003/0146961 A1 Aug. 7, 2003

(51) Int. Cl.⁷ .................................................. B41J 2/01
(52) U.S. Cl. ....................... 347/100; 347/95; 106/31.13
(58) Field of Search ........................... 347/100, 95, 96, 347/101, 98, 84, 1; 106/31.13, 31.27, 31.58, 31.6; 523/160

(56) References Cited

U.S. PATENT DOCUMENTS

| 4,147,544 | A |   | 4/1979  | Anderson et al. ........... 96/29 D |
| 4,165,238 | A |   | 8/1979  | Anderson et al. ......... 96/119 R |
| 4,357,410 | A |   | 11/1982 | Anderson et al. ............ 430/223 |
| 4,357,411 | A |   | 11/1982 | Kalenda ..................... 430/223 |
| 4,357,412 | A |   | 11/1982 | Anderson et al. ........... 430/223 |
| 4,824,485 | A |   | 4/1989  | Tanaka et al. |
| 5,980,622 | A | * | 11/1999 | Byers |
| 5,997,622 | A | * | 12/1999 | Weber et al. ............. 106/31.48 |
| 6,001,161 | A |   | 12/1999 | Evans et al. ............. 106/31.48 |
| 6,217,166 | B1 | * | 4/2001 | Saito et al. ................. 347/100 |
| 6,467,882 | B2 | * | 10/2002 | Inui et al. ..................... 347/56 |

FOREIGN PATENT DOCUMENTS

| EP | 0902064 | 3/1999 |
| EP | 1284200 | 2/2003 |

* cited by examiner

*Primary Examiner*—Stephen D. Meier
*Assistant Examiner*—Manish Shah

(57) ABSTRACT

The present invention is drawn toward inkjet images that are produced using small volume ink drops, and display improved visual properties, such as increased lightfastness and optical density. In one aspect, the ink may include a metalized dye having at least one heterocyclic nitrogen ring and a diazo bond wherein the heterocyclic nitrogen is chelated or complexed to a transition metal, and may be applied to a print media in drop volumes of about 8 pl or less.

28 Claims, No Drawings

INKJET IMAGES HAVING IMPROVED VISUAL PROPERTIES AND METHODS OF MAKING SAME

FIELD OF THE INVENTION

The present invention is drawn to inkjet images having improved visual properties. More particularly, the present invention is drawn to high quality images produced using small volume ink drops which display improved visual characteristics, such as lightfastness and optical density.

BACKGROUND OF THE INVENTION

In recent years, computer printer technology has evolved to a point where high-resolution images can be transferred to various media. Many of such images, are created using inkjet printers which place or "jet" ink drops onto a print surface. A number of reasons may account for the current popularity of inkjet printing, such as reduced noise, high speed recording capacity, and multi-color printing.

Various image characteristics determine overall image quality and may be manipulated in order to achieve desired results suitable to specific applications. Such characteristics include 1) edge acuity; 2) lightfastness; 3) optical density; 4) ink dry time; and 5) waterfastness, among others, and are determined by the specific ink formulations and printing equipment used.

In addition to image quality, printer equipment performance and reliability are major considerations in designing inkjet printer systems which are economically viable. Performance considerations such as consistent print accuracy, speed, durability, and long term reliability must be realized.

Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in inkjet printers represent a compromise in an attempt to achieve at least an adequate response in meeting all of the above listed requirements.

One particular printing application which has recently received much attention by inkjet printer manufactures is the printing of high quality images, such as photo images. In order to attain enhanced print quality and image quality as in a photograph, a variety of special print media have been developed to work with aqueous inks. However, such media is often cost prohibitive and is limited in its realistic use. Alternatively, images have been created using ink drops of relatively small volume in an effort to increase sharpness and achieve a photo print quality level of detail. Unfortunately, it has been found that images produced using small volume ink drops, such as those less than 5 pl, suffer from unusually low performance with respect to several visual characteristics, such as lightfastness and optical density. Particularly, the visual characteristic performance of small volume drops has been shown to be well below expected results based on comparatively larger ink volume drops.

Therefore, methods and systems which are capable of achieving photo quality print resolution while maximizing performance of various print quality characteristics, such as optical density and lightfastness are currently the focus of much research.

SUMMARY OF THE INVENTION

Accordingly, the present invention provides an image on a substrate which includes, or is made using a plurality of small volume inkjet ink drops, said ink having an ink vehicle and a metalized dye having a heterocyclic nitrogen and a diazo bond wherein the heterocyclic nitrogen is chelated or complexed to a transition metal. In one aspect, the ink drop volume may be less than about 8 pl. In another aspect, the ink drop volume may be less than about 5 pl.

In one aspect, the metalized dyes of the inks used in the present invention may include a pyridine group bonded to a quinolinol group through an azo bond. In another aspect, the metalized dye may include a pyridine group bonded to a naphthalene group through an azo bond. In yet another aspect, the PAQ metalized dye may be in a dicarboxylate form.

A wide variety of metals, including transition metals may be used in the metalized dye of the present inks. In one aspect, the metal may be a transition metal selected from the group consisting of nickel, copper, iron, cobalt, chromium, iron, including di and tri-valent forms thereof, as well as other di and tri-valent metal ions, and combinations thereof. In one aspect, the metal may be nickel. In anther aspect, the metal may be copper.

The amount ligand and metal contained in each dye may vary according to the knowledge of one skilled in the art in order to achieve a desired result. In one aspect, the ligand and transition metal, may be present in a molar ratio of 2:1. In another aspect, the ligand to transition metal molar ratio may be 1:1.

The amount of metalized dye which is included in the inks used in the present invention may be an effective amount which is determined by one ordinarily skilled in the art to be sufficient to achieve a particularly desired result. However, in one aspect, the metalized dye may be present in an amount of from about 0.2% w/w to about 8% w/w of the ink. In another aspect, the metalized dye may be present in an amount of from about 1.1% w/w to about 6% w/w of the ink. In addition to the image recited herein, the present invention additionally encompasses a method for producing such an image. In one aspect, a method for creating an inkjet image may include the step of jetting small volume drops of an inkjet ink onto a substrate, wherein the ink has an ink vehicle and an effective amount of a metalized dye with at least one heterocyclic nitrogen ring and a diazo bond, and wherein the heterocyclic nitrogen is chelated or completed to a transition metal. Additional inks containing various dyes as disclosed herein may also be utilized in such a method.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Definitions

Before the present images and methods are disclosed and described, it is to be understood that the present invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used.

The singular forms "a," "an," and, "the" include plural referents unless the context clearly dictates otherwise. Thus, for example, reference to "a dye" includes reference to one or more of such dyes, reference to "an ink" includes reference to one or more of such inks, and reference to "the color" includes reference to a mixture of one or more of such colors.

As used herein, "effective amount" refers to the minimal amount of a substance or agent, which is sufficient to achieve a desire effect. For example, an effective amount of an "ink vehicle" is the minimum amount required in order to create ink, which will meet the specified performance and characteristic standards. Additionally, the minimum amount of a "dye" would be the minimum amount, which can still achieve the specified performance and characteristic standards.

As used herein, "ink vehicle," refers to the vehicle in which a dye is placed to form ink. Ink vehicles are well known in the art, and a wide variety of ink vehicles may be used to form ink compositions which are useful in the present invention. Such ink vehicles may include a mixture of a variety of different agents, including without limitation, surfactants, solvents, co-solvents, buffers, biocides, viscosity modifiers, surface-active agents, and water.

The terms "formulation" and "composition" may be used interchangeably herein.

The terms "print media," "print surface," and "substrate" may be used interchangeably herein, and refer to a surface to which ink is applied in order to form an image.

As used herein, the phrase "small volume" as applied to ink drops refers to ink drops having an approximate size of less than about 10 picoliters (pl), when applied to a print surface.

As used herein, "chroma" refers to the brightness of a color exhibited by the inkjet ink once printed on the substrate. See, R. W. G. Hunt, *The Reproduction of Colour,* 5$^{th}$ Ed., Chap. 8.

As used herein, "lightfastness" refers to the ability of the ink-jet ink to retain its chroma and/or optical density as well as other hue properties over time.

As used herein, "optical density" refers to the fullness and intensity characteristics of an inkjet ink after application to a print medium. These visual effects are generally a measure of the concentration of ink at a given point on a print medium. Optical density may in one aspect be calculated as the negative log of the ratio of the light reflected off of the print media divided by the amount of light incident on the print media.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a concentration range of "about 0.2% w/w to about 8% w/w" should be interpreted to include not only the explicitly recited concentration of about 0.2% to about 8% w/w, but also include individual concentrations and the sub-ranges within the indicated range. Thus, included in this numerical range are individual concentrations such as 2% w/w, 5% w/w, and 6% w/w, and sub-ranges such as from 1% w/w to 3% w/w, from 2% w/w to 6% w/w, etc. The same principle applies to ranges reciting only one numerical value.

Similarly, a range recited as "less than about 8% w/w" should be interpreted to include all of the values and ranges as elaborated above for the range of "from about 0.2% w/w to about 8% w/w." Furthermore, such an interpretation should apply regardless of the breadth of the range or the characteristics being described.

Invention

Accordingly, the present invention relates to images made from small volume inkjet ink drops using inks that produce visual quality characteristics similar to images made with large volume ink drops. Such images achieve a level resolution and detail that greatly surpasses large volume drop images, while maintaining visual quality characteristics such as lightfastness, optical density, and chroma. Images of this type may be used in a wide variety of high quality applications, such as photo printing, etc.

The ink drop volume of images made in accordance with the present invention include small volumes of about 10 pl and below. In one aspect, the ink drop volume may be less than about 8 pl. In another aspect, the ink drop volume may be less than about 5 pl.

The inkjet inks useful in the present invention generally include one or more metalized dyes having heterocyclic nitrogens and diazo bonds. The heterocyclic nitrogens may further act to complex or chelate a transition metal. Examples of suitable transition metals include without limitation nickel, copper, iron, and/or cobalt.

In one aspect the metalized dyes may include a pyridine group bonded to a quinolinol group through an azo bond. In another aspect, the metallized dye may include a pyridine group bonded to a naphthalene group through an azo bond. In yet another aspect, metalized dyes of these types may be at least a tridentate dye, wherein the metal ion is chelated with a heterocyclic nitrogen and an azo nitrogen.

The metal in the dye may be chelated or complexed to any one or more of the nitrogens in the dye. For example, metal chelates or complexes may be formed with the heterocyclic nitrogens, nitrogens of the diazo bond, and nitrogens of groups bonded to the heterocyclic nitrogen ring through the diazo bond, e.g., a naphthalene group or quinolinol group.

Among others, two general classes of metallized dyes have been found to be particularly useful with the present invention. The first class of dyes includes metallized pyridylazoquinolinol (PAQ) dyes, and the second class includes metallized pyridylazonaphthol (PAN) dyes.

Representative class structures are depicted as follows:

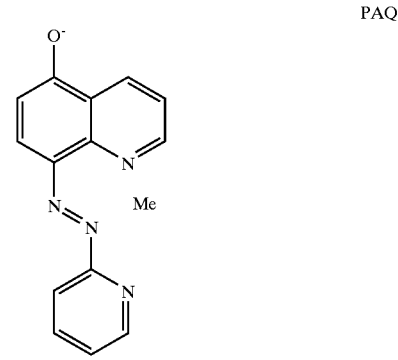

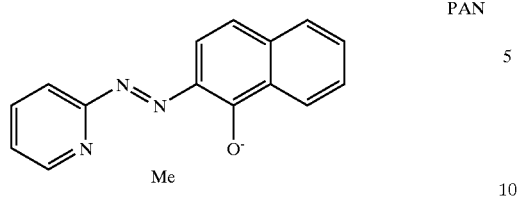

PAN

In the above compounds, Me represents a transition metal cation that is complexed or chelated to the heterocyclic nitrogen and/or a diazo bond nitrogen by means of ionic, coordinate covalent, or covalent bonding. Such bonds have not been specifically represented in the structures because the exact nature of the bonding, e.g., covalent, ionic, π-bond, coordinate covalent, etc., between the electron rich ligand and the electrophilic transition metal cannot be drawn by conventional metal to ligand bonding lines.

Additionally, a variety of structural variations to the ligand can be implemented in order to modify the functionality of the dye in accordance with the present invention. U.S. Pat. Nos. 4,147,544 4,165,238, 4,357,410, 4,357,411, 4,357,412, 5,980,622, 5,997,622, and 6,001,161, each of which are incorporated herein in their entirety, disclose such structural variations to the above-represented PAN and PAQ compounds.

For example, U.S. Pat. No. 6,001,161 teaches that any of the aromatic rings can be modified at appropriate sites by unsubstituted alkyl group of 1–6 carbon atoms, a substituted or unsubstituted aryl group of 6–10 carbon atoms, a substituted or unsubstituted heteroaryl group of 5–10 atoms, halogen, cyano, nitro, a substituted or unsubstituted alkoxycarbonyl group of 1–6 carbon atoms, a substituted or unsubstituted alkoxy group of 1–6 carbon atoms, hydroxy, a polyoxyalkylene group of 2–20 alkylene oxide residues, carboxy or a salt thereof, sulfo or a salt thereof, phospho or a salt thereof, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, sulfonylamino, amino, a substituted or unsubstituted alkyl-, aralkyl-, aryl-, diaryl- or dialkyl-amino group of 1–20 carbon atoms or a quaternary ammonium or phosphonium group. Additionally, U.S. Pat. No. 5,980,622 teaches that one of the aromatic structures can be modified with $SO_3M$ wherein M is a positively charged moiety, or $SO_2NR_4R_5$ where $R_4$ and $R_5$ are independently selected from the group consisting of hydrogen and hydrophobic oil-solubilizing moieties, or $R_4$ is selected from the group consisting of hydrogen and hydrophilic water-solubilizing moieties and $R_5$ is selected from the group consisting of hydrophilic water solubilizing moieties.

Examples of specific pyridylazoquinolinol (PAQ) dyes and pyridylazonaphthol (PAN) dyes that may be used in accordance with the present invention, and which are within the scope of the PAQ and PAN compounds delineated above include without limitation:

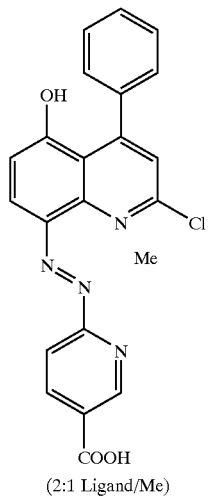

(2:1 Ligand/Me)

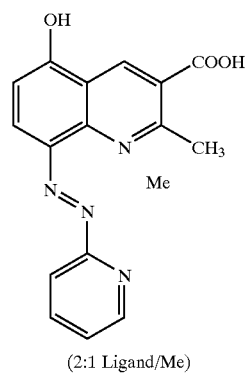

(2:1 Ligand/Me)

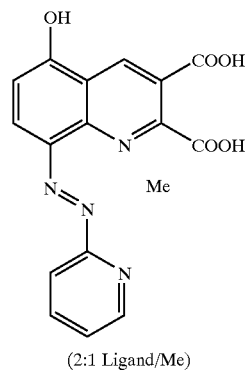

(2:1 Ligand/Me)

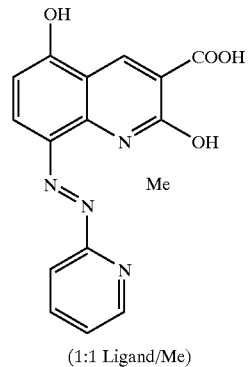

(1:1 Ligand/Me)

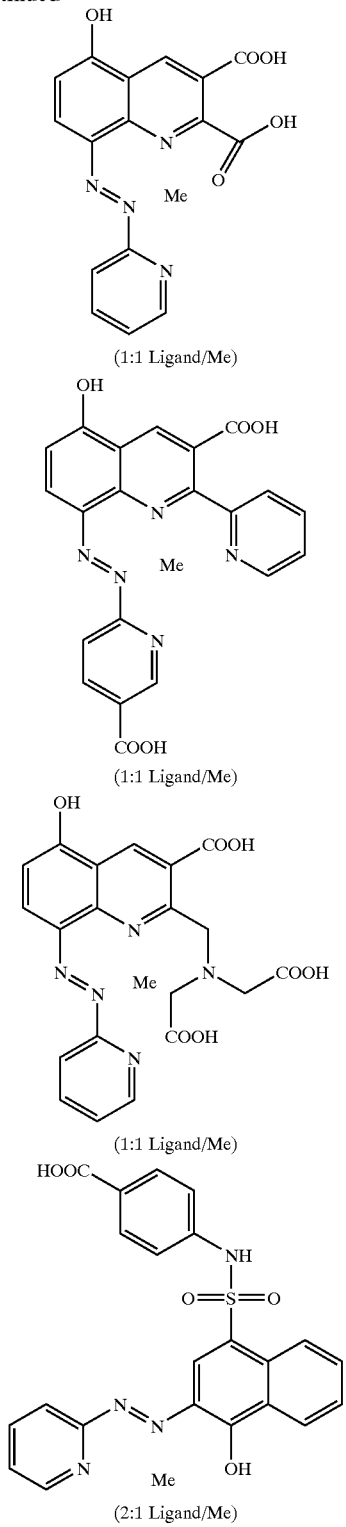

(1:1 Ligand/Me)

(1:1 Ligand/Me)

(1:1 Ligand/Me)

(2:1 Ligand/Me)

As mentioned earlier, in the dye structures listed above, the Me group represents a transition metal which is chelated or complexed to the ligand structure. The ligand/Me ratios specified indicate the typical ligand to metal ratio which is achieved by the particular dye. Those skilled in the art will readily recognize that the actual ligand/Me ratio may vary depending on the properties of the specific metal used. Further, the it is believed that the Me ion coordinates or complexes with three or more nitrogen atoms present on each ligand structure, i.e., one of the azo nitrogens, a pyridine nitrogen, and a quinolinol nitrogen (PAQ). With respect to the 1:1 ligand/Me complexes, only one ligand is bound to the metal ion. Thus, depending upon the presence of pendant coordinating moieties, and upon the specific metal used, there are a number of additional coordination sites available on the metal. These unbound coordination sites are most likely filled by water, or as in some cases other portions of the ligand can bind to the metal ion as well.

With several dyes, a small amount of pyridine, e.g., about 1% by weight, can be added to the ink to improve the solubility. Additionally, other factors may be adjusted to achieve desired solubility, such as pH.

In one aspect, the ink used in the present invention may include an effective amount of one or more metalized dyes having at least one heterocyclic nitrogen ring and a diazo bond wherein the heterocyclic nitrogen is chelated or complexed to a transition metal. In another aspect, the amount of dye may be from about 0.2% w/w to about 8.0% w/w of the ink. In yet another aspect, the amount of dye may be from about 1.1% w/w to about 6% w/w of the ink.

In addition to the above-recited metalized dyes, the inks used in the present invention generally include an ink vehicle in order to form the ink, or ink formulation. Many well-known ink vehicles may be used in combination with the dyes disclosed herein to produce the ink composition of the present invention. A variety of ingredients in varying amounts may be included in the ink vehicle of the present composition, such as water, organic solvents, surface-active agents, buffers, viscosity modifiers, biocides, surfactants, and metal chelators.

Water may make up a large percentage of the overall ink vehicle of the present invention. In one aspect, the water may be deionized water in an amount of from about 51 to 90 percent by weight of the ink composition. Various deionization techniques and states for water are known. In one aspect, the water may be deionized at 18 Mohm.

Organic solvents, or co-solvents may be included as a component of the ink vehicle, and are generally water-soluble solvents. In one aspect, the amount of organic solvent component may be from about 10 to about 49 percent by weight of the ink vehicle.

One or more solvents may be used to achieve the amount specified above. Further, when a mixture of solvents is used, the combination may be included in a variety of ratios when necessary to achieve a specific result.

Examples of suitable solvents include without limitation: nitrogen-containing heterocyclic ketones, such as 2-pyrrolidone, N-methyl-pyrrolid-2-one, 1,3-dimethylimidazolid-2-one, and octyl-pyrrolidone; diols such as ethanediols, (e.g., 1–2-ethandiol), propanediols (e.g., 1,2-propanediol, 1,3-propanediol, 2-ethyl-2-hydroxy-methyl-1, 3-propanediol, ethylhydroxy-propanediol), butanediols (e.g., 1,2-butanediol, 1,3-butanediol, 1,4-butanediol), pentanediols (e.g., 1,5-pentanediol), hexanediols (e.g., 1,6-hexanediol, 2,5-hexanediol), heptanediols (e.g., 1,2-heptanediol, 1,7-heptanediol), octanediols (e.g., 1,2-octanediol, 1,8-octainediol); and glycols, glycol ethers and thioglycol ethers, commonly employed in ink-jet inks, such as polyalkylene glycols such as polyethylene glycols (e.g., diethylene glycol, triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol.

When included, the surfactant ingredient may be added in an amount of up to about 5 percent by weight of the ink composition. In one aspect, the surfactant may be present in an amount of from about 0.01 to about 4%. Such amounts may be achieved using a single surfactant ingredient, or a mixture of surfactant ingredients.

Generally, surfactants are used in order to increase the penetration of the ink into the print medium. A wide variety of surfactant classes may be used including without limitation, cationic, anionic, zwitterionic or non-ionic surfactants. One example of nonionic surfactants is secondary alcohol ethoxylates. Such compounds are commercially available, for example, from Union Carbide Co. (Houston, Tex.) and other producers as the Tergitol, Surfynol, and Dowfax series, such as TERGITOL 15-S-5, TERGITOL 15-S-7, SURFYNOL 104E, SURFYNOL 440, and DOW-FAX 8390.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Examples of other classes of surfactants those skilled in the art will readily recognize specific examples of the other classes of surfactants recited above, as well as any other suitable surfactants for use with the present invention.

The ink vehicle of the present ink composition may optionally include up to about 5 percent by weight of a biocide. In one aspect, the biocide may be present in an amount of up to about 1 percent by weight of the ink composition. In a further aspect, the biocide may be present in an amount of up to 0.2 percent by weight of the ink composition. Such amounts may be the result of a single biocide ingredient, or a mixture of two or more biocides.

Any of the biocides commonly employed in inkjet inks, and known to those skilled in the art may be used in the practice of the present invention, such as NUOSEPT 95, available from Hals America (Piscataway, N.J.); PROXEL GXL, available from Zeneca (Wilmington, Del.); and glutaraldehyde, available from Union Carbide Company (Bound Brook, N.J.) under the trade designation UCAR-CIDE 250. In one aspect, the biocide is PROXEL GXL.

In addition to the above-recited ingredients, the present inkjet ink composition may include a buffer agent. In one aspect, the buffer agent may be present in an amount of up to about 5 percent by weight of the ink composition. In another aspect, the buffer may be present in an amount of up to about 1 percent by weight of the ink composition. These amounts may be achieved using a single buffer agent, or a combination of buffer agents.

The buffers in the ink vehicle are primarily used to modulate pH. Such buffers can be organic-based biological buffers, or inorganic buffers. The specific type and amount of buffer may be readily selected by one of ordinary skill in the art in order to achieve a specific result.

Metal chelator agents may be included in the ink vehicle of the present ink composition. In one aspect, the metal chelator may be present in an amount of up to about 2 percent by weight. In another aspect, the metal chelator may be present in an amount of up to about 1 percent by weight of the ink composition. In a further aspect, the metal chelator may be present in an amount of up to about 0.1 percent of the ink composition. In yet another aspect, the metal chelator may be present in an amount of up to about 0.01 percent by weight of the ink composition. One or more metal chelators may be used to achieve these amounts.

Small and moderate quantities of metal chelators may be employed in the practice of the invention to bind transition metal cations that may be present in the ink. However, care must be taken to ensure that such metal chelators are used sparingly, as excessive amounts may reduce, rather than increase, the ability of the metal cation to chelate with the nitrogens on the dye. A variety of metal chelators may be used in connection with the present invention as will be recognized by those skilled in the art. Examples of suitable metal chelators include without limitation, Ethylenediaminetetra acetic acid, Diethylenetriaminepentaacetic acid, trans-1,2-diaminocyclohexanetetraacetic acid, (ethylenedioxy) diethylenedinitrilotetraacetic acid (EGTA), and other chelators that bind transition metal cations. In one aspect, the metal chelator is EDTA.

EXAMPLE

In order to demonstrate the superior visual characteristics of the present images and methods, the following test was conducted. Separate small drop and large drop images were formed on a Boise Cascade Offset paper substrates using an HP Business Inkjet 2200 printer with 4.5 and 18 picoliter (pl) pens respectively. Ink Formulations 1 and 2 as enumerated in Table 1 below were prepared for testing in both the small and large drop volume images. The ink dye PAQ 98 of Formulation 2 is a metalized dye having at least one heterocyclic nitrogen ring and a diazo bond wherein the heterocyclic nitrogen is chelated or complexed to a transition metal in accordance with the present invention.

TABLE 1

| | Grams of Component | |
|---|---|---|
| Component | Formulation 1 | Formulation 2 |
| Di carboxylic acid | 1.292 | 0 |
| Octyl dimethyl glycine | 1.105 | 1.043 |
| Oleyl triethoxy mono diphosphate | 0.13 | 0.106 |
| Secondary alcohol ethoxylate | 0.17 | 0.171 |
| Alkyl diol | 2.955 | 2.856 |
| 2-pyrrolidione | 1.484 | 1.429 |
| Ethoxylated Glycerol | 0.858 | 0.794 |
| Nonionic surfactant | 0.13 | 0.12 |
| Chelator | 0.024 | 0.024 |
| De-ionized water | 7.766 | 17.507 |
| Dye PAQ 98 | 0.0 | 0.737 |
| AR52 as a 8.15% soln. | 9.257 | 0.0 |

Following printing, each image was faded for one day using high intensity fluorescent lights. The optical density (O.D.) of each sample was read before and after fade. The optical density performance results of each image are shown in Table 2 below.

TABLE 2

| Ink and Pen Volume | Avg. Starting O.D. | Avg. Ending O.D. | % Remaining | Small/Large Drop Diff. |
|---|---|---|---|---|
| PAQ 98 Dye 4.5 pl pen | 0.21 | 0.16 | 79.0% | |
| PAQ 98 Dye 18 pl pen | 0.38 | 0.33 | 87.6% | 90.2% |
| AR452 Dye 4.5 pl pen | 0.15 | 0.02 | 13.0% | |
| AR52 Dye 18 pl pen | 0.50 | 0.13 | 26.2% | 49.8% |

As can be seen from these results, the images of the present invention achieve visual qualities which are significantly superior to other small volume drop images. Such images present an exceptional level of detail and acuity, while retaining desired lightfastness and optical density properties to produce truly ultra-high quality images.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for creating an inkjet image comprising the step of:
   jetting small volume drops of an inkjet ink onto a substrate, said ink having an ink vehicle and an effective amount of a metalized dye that includes a pyridine group bonded to a quinolinol group through an azo bond, and has at least one heterocyclic nitrogen chelated or complexed to a transition metal.

2. The method of claim 1, wherein the ink drop volume is less than about 5 pl.

3. The method of claim 1, wherein the transition metal is selected from the group consisting of nickel, copper, iron, cobalt, chromium, and combinations thereof.

4. The method of claim 1, wherein the metalized dye has a ligand to transition metal molar ratio of 2:1.

5. The method of claim 1, wherein the metalized dye has a ligand to transition metal molar ratio of 1:1.

6. The method of claim 1, wherein the metalized dye is present in an amount of from about 0.2% w/w to about 8% w/w of the ink.

7. The method of claim 6, wherein the metalized dye is present in an amount of from about 1.1% w/w to about 6% w/w of the ink.

8. A method for creating an inkjet image comprising the step of:
   jetting small volume drops of an inkjet ink onto a substrate, said ink having an ink vehicle and an effective amount of a tridentate metalized dye having at least one heterocyclic nitrogen ring and a diazo bond wherein the heterocyclic nitrogen and an azo nitrogen are chelated or complexed to a transition metal.

9. The method of claim 8, wherein the ink drop volume is less than about 5 pl.

10. The method of claim 8, wherein the transition metal is selected from the group consisting of nickel, copper, iron, cobalt, chromium, and combinations thereof.

11. The method of claim 8, wherein the metalized dye has a ligand to transition metal molar ratio of 2:1.

12. The method of claim 8, wherein the metalized dye has a ligand to transition metal molar ratio of 1:1.

13. The method of claim 8, wherein the metalized dye is present in an amount of from about 0.2% w/w to about 8% w/w of the ink.

14. The method of claim 13, wherein the metalized dye is present in an amount of from about 1.1% w/w to about 6% w/w of the ink.

15. An image on a substrate comprising:
   a plurality of small volume inkjet ink drops, said ink having an ink vehicle and a metalized dye that includes a pyridine group bonded to a quinolinol group through an azo bond, and has at least one heterocyclic nitrogen chelated or complexed to a transition metal.

16. The image of claim 15, wherein the ink drop volume is less than about 5 pl.

17. The image of claim 15, wherein the transition metal is selected from the group consisting of nickel, copper, iron, cobalt, chromium, and combinations thereof.

18. The image of claim 15, wherein the metalized dye has a ligand to transition metal molar ratio of 2:1.

19. The image of claim 15, wherein the metalized dye has a ligand to transition metal molar ratio of 1:1.

20. The image of claim 15, wherein the metalized dye is present in an amount of from about 0.2% w/w to about 8% w/w of the ink.

21. The image of claim 20, wherein the metalized dye is present in an amount of from about 1.1% w/w to about 6% w/w of the ink.

22. An image on a substrate comprising:
   a plurality of small volume inkjet ink drops, said ink having an ink vehicle and an effective amount of a tridentate metalized dye having at least one heterocyclic nitrogen ring and a diazo bond wherein the heterocyclic nitrogen and an azo nitrogen are chelated or complexed to a transition metal.

23. The image of claim 22, wherein the ink drop volume is less than about 5 pl.

24. The image of claim 22, wherein the transition metal is selected from the group consisting of nickel, copper, iron, cobalt, chromium, and combinations thereof.

25. The image of claim 22, wherein the metalized dye has a ligand to transition metal molar ratio of 2:1.

26. The image of claim 22, wherein the metalized dye has a ligand to transition metal molar ratio of 1:1.

27. The image of claim 22, wherein the metalized dye is present in an amount of from about 0.2% w/w to about 8% w/w of the ink.

28. The image of claim 27, wherein the metalized dye is present in an amount of from about 1.1% w/w to about 6% w/w of the ink.

* * * * *